UNITED STATES PATENT OFFICE 2,518,748

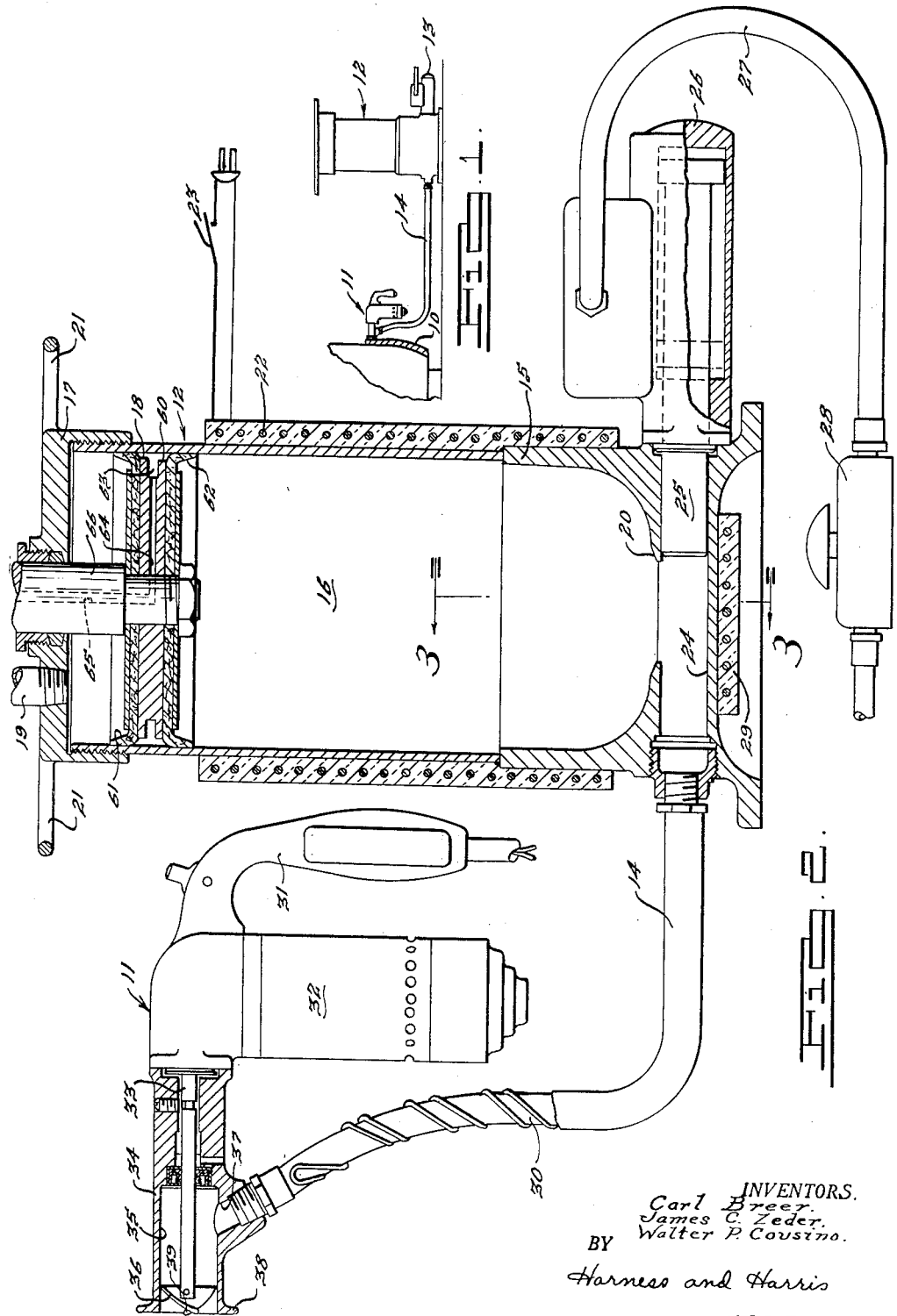

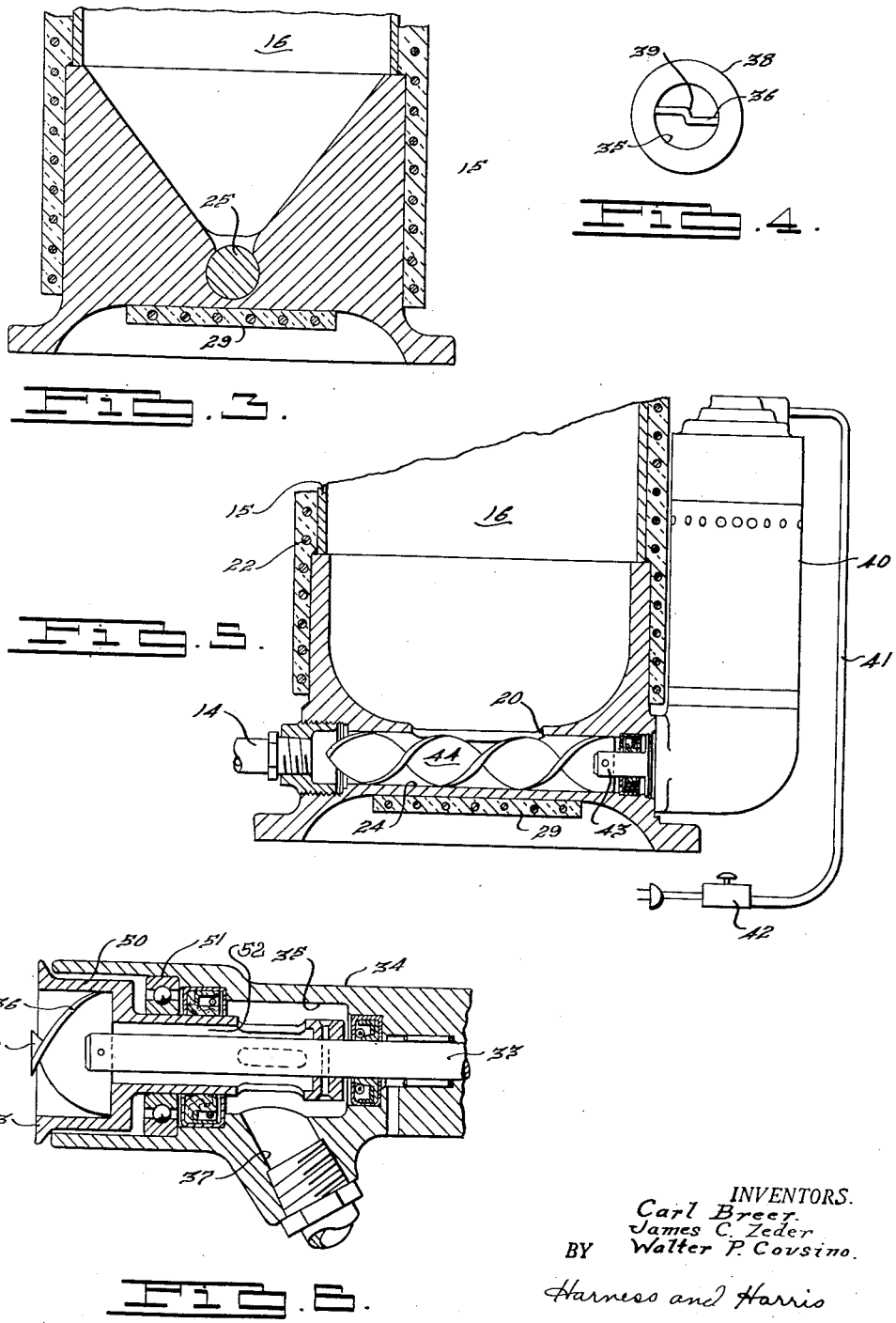

MODELING APPARATUS

Carl Breer, Grosse Pointe, James C. Zeder, Bloomfield Hills, and Walter P. Cousino, Detroit, Mich., assignors to Chrysler Corporation, Highland Park, Mich., a corporation of Delaware Application November 9, 1946, Serial No. 708,822

11 Claims. (Cl. 25—1)

This invention relates to an apparatus for building models and more particularly to apparatus for applying and working modeling clay or similar material.

The use of models to study advanced designs is common practice in many industries including the automotive and furniture industries. The models are usually constructed on a wooden form by the application of a pliable substance which will hereinafter be referred to as modeling clay. This clay requires considerable kneading during its application to bond the layers thereof together. Heretofore the application of this clay and its working has been done by hand which is a slow and tedious process.

It is an object of this invention to provide automatic means to distribute clay on the model and simultaneously to wipe the clay into and integrally unite it with the main body of clay already applied to the model.

It is a further object of the invention to provide means for controlling both the feed and wiping of the clay.

Means are also provided to control the temperature and consistency of the clay to maintain it at its most advantageous temperature for working.

It is an object of this invention to combine the application of thin layers of clay with means to apply these layers in relatively rapid succession and with means to knead the clay simultaneously with its application so that the time required for the construction of a model will be greatly reduced.

In the drawings:

Fig. 1 is an elevation showing the use of the apparatus in relation to a model;

Fig. 2 is a vertical section of the apparatus;

Fig. 3 is a section on the line 3—3 of Fig. 2;

Fig. 4 is an end view of the wiper;

Fig. 5 is a vertical section of a modified form of tank and feeding means; and

Fig. 6 is a vertical section of a modified form of wiper.

Modeling clay is a plastic, kneadable material which flows better with increased temperature. Modeling clay will be referred to herein although other materials possessing the required properties could be substituted.

In Fig. 1 the apparatus is illustrated in the operation of applying clay to a model 10 of a motor vehicle. The apparatus comprises a portable portion 11 which is adapted to be held in the operator's hand and a stationary portion 12 which serves as a tank or clay reservoir. A motor 13 is used to feed clay from the reservoir 12 through a hose 14 which is connected with the portable portion. By movement of the portable portion the operator is able to distribute the clay as desired upon the surface of the model 10 to build up any desired contour on the model.

In Fig. 2 the apparatus is illustrated in more detail. The stationary portion 12 comprises a housing 15 and a cylinder 16 formed therein which serves as a reservoir for clay. A cover 17 is threaded to the top portion of the housing 15. A piston element 18 having a piston rod 66 is slidably mounted in cylinder 16. An air inlet 19 is connected with any suitable source of air pressure and penetrates the cover 17 on housing 15 thereby exposing that portion of the housing 15 above the piston 18 to a constant air pressure. The piston 18 comprises a central plate 60, a gasket element 61 bolted to the upper surface of plate 60 and a gasket element 62 bolted to the lower surface of the plate 60. The gasket elements are in constant engagement with the walls of reservoir 16 and act as piston rings to prevent the leakage of air around the piston and into the clay. A circumferential recess 63 is provided on plate 60. An air passage 64 is provided from the recess 63 through the plate 60 and opens into a passage 65 provided in the piston rod 66. The passage 65 is open to the atmosphere. Any air that should leak past the gasket 61 will thus have a passage back through recess 63, passages 64 and 65, and will have less tendency to leak past the gasket 62 than if no such passage had been provided. Any air that has been trapped in the reservoir 16 will be forced upwardly around the gasket 62 as the piston moves downward. This air may use the same passage to escape through recess 63, and passages 64 and 65.

The lower portion of housing 15 is provided with an orifice 20. Gradual downward motion of the piston 18 under the influence of air pressure forces clay from reservoir 16 out of orifice 20. Suitable handles 21 are provided on cover 17 so that the cover may be unscrewed from the housing 15. The removal of the cover 17 permits the operator to lift out piston 18 and add clay to the reservoir 16. Electric resistance wires 22 are positioned adjacent the walls of the housing or tank 15 so that the clay may be warmed to thereby facilitate its flow. A switch 23 is provided in the circuit of the wires 22 so that the operator may selectively control the application of heat. The wires 22 may be connected with any suitable source of electric current.

The lower portion of housing 15 is provided with a transverse open cylindrical passage 24. A plunger 25 is slidably mounted in cylinder 24. A conventional air-driven motor 26 is mounted on housing 15 and operably connected to the plunger 25 so that the latter is reciprocated in cylinder 24. A flexible hose 14 is connected to the open end of cylinder 24 opposite the motor 26. An air hose 27 connects motor 26 with any suitable source of compressed air. A manually operable valve 28 is inserted in the air hose 27 and is preferably so positioned that it may be actuated by the operator's foot to interrupt the passage of air to the motor 26. A gradual downward motion of piston 18 forces clay from reservoir 16 into cylindrical passage 24 through orifice 20 and the reciprocation of plunger 25 in cylinder 24 forces clay into hose 14. An electric heating element 29 is preferably secured to the housing 15 below the cylinder 24 so that heat may be applied to the clay while it is in the cylinder 24. Resistance wires 30 are wound around the hose 14 so that the clay in the hose 14 may be maintained at its most advantageous temperature for flow in the hose 14. If desired the heating coils 22, 29, and 30 may be wired in series with the switch 23 so that the application of heat along the entire path of the clay is within the control of the operator.

The portable element 11 includes a hand grip 31 on which is suspended an electric motor 32 having shaft 33 operably connected thereto. A head 34 encompasses the shaft 33 and has a passage 35 formed adjacent one end thereof. The shaft 33 extends longitudinally throughout substantially the entire length of the cylinder 35. A wiper 36 is secured to shaft 33. The hose 14 is connected to a passage 37 in head 34. The passage 37 leads to the passage 35. There is thus a path provided for the clay from the cylindrical passage 24 through the hose 14, the passage 37 and into the cylinder 35. The clay is moved in this path by the reciprocation of the plunger 25. Rotation of wiper 36 discharges clay from the passage 35 in combination with the extrusion of clay from passage 35 by the entrance of additional clay from passage 37. The head 34 adjacent the open end of the passage 35 is provided with a laterally extending guide portion 38 which in operation is placed against the model. The end 39 of the screw 36 serves as a wiper to rub the discharged clay or other modeling material into and integrally unite it with the main body of clay being built up on the model. This movement of the wiper kneads the plastic material and simulates repeated rubbing by the fingers of the operator as heretofore done in the application of this clay. The apparatus preferably deposits a thin layer of clay which is easily kneaded by the screw 36. The electric drive permits many layers of clay to be put on quickly.

In Fig. 5 a modified construction or feeding means is illustrated. In this construction the tank 15 is provided with the cylinder 16, orifice 20, cylinder 24, heating coil 22, and heater 29 as discussed with reference to the Fig. 2 construction. An electric feed means is substituted in the cylinder 24 for the air feeding means discussed with reference to Fig. 2. An electric motor 40 is secured to the housing 15 and connected by cable 41 with a suitable source of electric energy. A switch 42 is provided in the cable 41 to provide selective operation of the motor 40 in the same manner that the air valve 28 in Fig. 2 controlled the operation of the air motor 26. An output shaft 43 on the motor 40 extends into cylinder 24. A spiral screw element 44 is rotatably mounted in cylinder 24 and pinned to shaft 43. In operation the electric motor 40 rotates shaft 43 and spiral screw 44 as clay is discharged from reservoir 16 into the cylinder 24 under the influence of piston 18. The rotation of the spiral screw 44 feeds the clay from cylinder 24 into hose 14. Hose 14 is connected to the portable unit as discussed above.

Fig. 6 illustrates a modified form of head 34. A motor shaft 33, passage 37, and screw 36 are provided as discussed with reference to Fig. 2. A body element 50 is rotatably mounted in the head 34 in bearing 51. The passage 52 is provided through the body element from the cylinder 35 to the screw 36. The body element is keyed to the shaft 33. The body element 50 is provided with a flat circumferential end portion 53 which serves to supplement the wiping effect of the clay of the end 39 of the wiper 36.

If desired, it would be possible to eliminate the hose 14 and connect the head 34 and screw 36 to the spiral screw 44 in Fig. 5. This would require the use of a relatively small tank 15 so that the entire apparatus would be portable.

We claim:

1. An apparatus for applying plastic material to the surface of a model comprising a portable head having a cylindrical opening therein, means to extrude said material from said opening, a rotatable wiper element located in said opening and rotatably mounted in said head, means to rotate said element, said element having a spiral contour to facilitate the extrusion of said material from said opening and a flat, curved end portion adapted to knead material on the surface of said model.

2. An apparatus for applying plastic material to a model comprising an head element adapted to be carried by hand and having a discharge orifice, a tank having a reservoir for said material and a discharge orifice, a flexible connection between said tank discharge orifice and said head element, means associated with said tank and adapted to force material from said tank through said connection to said head and extrude said material from the discharge orifice of said head element, rotatable wiper means associated with said head element having a spiral contour to facilitate the extrusion of said material and a flat, curved end portion adapted to knead material on the surface of said model and means to rotate said wiper means.

3. An apparatus for applying plastic material to a model comprising a portable head element having a chamber and a discharge orifice, a tank having a reservoir for said material and a discharge orifice, a flexible connection between said tank discharge orifice and said chamber, means associated with said tank and adapted to force material from said tank through said connection to said chamber and extrude said material from the discharge orifice of said head element, a wiper located in said chamber and rotatably mounted in said head element, means to rotate said wiper, said wiper when rotated being adapted to knead said extruded material on the surface of said model, and switch-controlled electric resistance heating elements associated with said tank and disposed substantially concentrically with said connection to control the temperature and consistency of said plastic material.

4. An apparatus for applying plastic material to a model comprising a head element adapted to be carried by hand and having a chamber and a discharge orifice, a tank having a reservoir for said material and a discharge orifice, a piston slidably mounted in said tank, fluid pressure means for moving said piston and extruding said material from said orifice, means to transport said material to said chamber and extrude said material from the discharge orifice of said head element, a wiper located in said chamber and rotatably mounted in said head element, means to rotate said wiper, said wiper when rotated and placed in close proximity to said model being adapted to knead said material on the surface of said model.

5. An apparatus for applying plastic material to a model comprising a portable head element having a chamber and a discharge orifice, a tank having a reservoir for said material and a second discharge orifice, fluid pressure means associated with said tank and adapted to force said material from said second discharge orifice, a flexible connection between said second discharge orifice and said chamber, said tank being provided with an open cylinder therein adjacent said second orifice, a plunger adapted to reciprocate in said cylinder to force said material from said second orifice through said cylinder, said connection and said chamber to the discharge orifice of said head, air motor means to reciprocate said plunger, a wiper located in said chamber and rotatably mounted in said head element, means to rotate said wiper whereby said wiper when rotated and placed in close proximity to said model kneads said extruded material on the surface of said model.

6. An apparatus for applying plastic material to a model comprising a portable head element having a chamber and a discharge orifice, a tank having a reservoir for said material and a second discharge orifice, fluid pressure means associated with said tank and adapted to force said material from said second discharge orifice, a flexible connection between said second discharge orifice and said chamber, said tank being provided with an open cylindrical passage adjacent said second orifice, a connection between said cylindrical passage and said chamber, a screw element adapted for rotation in said cylindrical passage, electric motor means to rotate said screw element and feed said material from said second orifice through said cylindrical passage, said connection and said chamber to the discharge orifice of said head, a wiper located in said chamber and rotatably mounted in said head element, means to rotate said wiper whereby said wiper when rotated and placed in close proximity to the surface of said model kneads the extruded material on the surface of said model.

7. An apparatus for applying plastic material to a model comprising a portable head element having a chamber and a discharge orifice, a tank having a reservoir for said material and a second discharge orifice, fluid pressure means associated with said tank and adapted to force said material from said second discharge orifice, a flexible connection between said second discharge orifice and said chamber, power operated feeding means adapted to force said material through said connection and chamber to the discharge orifice of said head element, a wiper located in said chamber and rotatably mounted in said head element, means to rotate said wiper whereby said wiper when rotated and placed in close proximity to said model kneads said extruded material on the surface of said model, and control means for selectively operating said power operated feeding means so that the operator may operate the wiper element independently of the extrusion of additional material.

8. In apparatus for applying plastic material to the surface of a model and comprising a head member adapted to be carried by hand and having a cylindrical opening therein, means to extrude said material from said opening, and power means associated with said member, a rotatable wiper element adapted to be rotatably mounted in said head and adpated to be rotated by said power means, said element having a spiral contour and an end portion adapted to project slightly beyond the plane of said opening, the open end of said head member presenting a flat surface to said model and having portions extending radially outward from the axis of said wiper element.

9. An apparatus for applying plastic material to a model comprising a head element adapted to be carried by hand and having a chamber and a discharge orifice, a tank having a reservoir for said material and a discharge orifice, a piston slidably mounted in said tank, fluid pressure means for moving said piston and extruding said material from the discharge orifice of said tank, said tank being provided with an open cylinder therein adjacent said last-mentioned orifice, a flexible connection between said open cylinder and the chamber in the head element, power means positioned in said cylinder and adapted to force said material from said tank discharge orifice through said cylinder, said connection and said chamber to the discharge orifice of said head, a wiper located in said chamber and rotatably carried by said head element, and means to rotate said wiper whereby said wiper when rotated and placed in close proximity to said model kneads said extruded material on the surface of said model.

10. An apparatus for applying plastic material to a model comprising a head element having a discharge orifice and adapted to be carried by hand, a tank having a reservoir for said material and a discharge orifice, a flexible connection between said tank discharge orifice and said head element, means associated with said tank and adapted to force material from said tank through said connection to said head element and extrude said material from the discharge orifice of said head element, rotatable wiper means associated with said head element having a spiral contour to facilitate the extrusion of said material and a flat, curved end portion adapted to knead material as said head is moved laterally with respect to the surface of said model, and means to rotate said wiper means.

11. An apparatus for applying plastic material to a model comprising a portable head element having a discharge orifice, means to extrude said plastic material from said orifice, means for feeding said plastic material to said head element, heating means operatively associated with said feeding means for controlling the temperature and consistency of said material extruded from said orifice, and means associated with said head element and adapted to knead said extruded material on the surface of said model.

CARL BREER.
JAMES C. ZEDER.
WALTER P. COUSINO.

(References on following page)

REFERENCES CITED

The following references are of record in the file of this patent:

UNITED STATES PATENTS

| Number | Name | Date |
|---|---|---|
| 788,379 | Rich | Apr. 25, 1905 |
| 1,017,256 | Fox | Feb. 13, 1912 |
| 1,040,253 | Ray | Oct. 1, 1912 |
| 1,347,973 | Rotinoff | July 27, 1920 |
| 1,401,397 | Day | Dec. 27, 1921 |
| 1,547,937 | Miller | July 28, 1928 |
| 1,766,419 | Wertz | June 24, 1930 |
| 1,839,891 | Perkins | Jan. 5, 1932 |
| 2,004,978 | Conley | June 18, 1935 |